US008787832B2

(12) United States Patent
Herron et al.

(10) Patent No.: US 8,787,832 B2
(45) Date of Patent: Jul. 22, 2014

(54) DYNAMIC RANGE WIRELESS COMMUNICATIONS ACCESS POINT

(75) Inventors: Jeffrey Andrew Herron, Redmond, WA (US); Gerald Reuben DeJean, II, Redmond, WA (US); Darko Kirovski, Kirkland, WA (US); Miller Thomas Abel, Mercer Island, WA (US); Craig Scott Brenner, Sammamish, WA (US); William Thomas Blank, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 112 days.

(21) Appl. No.: 13/270,246

(22) Filed: Oct. 11, 2011

(65) Prior Publication Data

US 2013/0090064 A1 Apr. 11, 2013

(51) Int. Cl.
*H04B 7/00* (2006.01)

(52) U.S. Cl.
USPC .................... 455/41.2; 455/127.4; 455/176.1; 455/177.1

(58) Field of Classification Search
CPC ..... H04W 36/14; H04W 36/30; H04W 88/04; H04W 88/06; H04W 88/08; H04B 5/00; H04B 7/26
USPC ............... 455/412, 41.2, 127.4, 176.1, 177.1, 455/200.1, 188.1, 412.1, 414.2
See application file for complete search history.

(56) References Cited

U.S. PATENT DOCUMENTS 7,039,022 B1 * 5/2006 Hedeas ......................... 370/310
7,126,926 B1 * 10/2006 Bjorklund et al. ............ 370/328
7,174,130 B2 2/2007 Kurisko et al.
7,254,367 B2 8/2007 Helden et al.
7,657,255 B2 2/2010 Abel et al.
7,953,400 B2 5/2011 Lee et al.
7,991,423 B2 * 8/2011 Olson et al. ................... 455/522
8,180,591 B2 * 5/2012 Yuen et al. .................... 702/160
2006/0286984 A1 12/2006 Bonner (Continued)

FOREIGN PATENT DOCUMENTS

WO 2004109992 A1 12/2004

OTHER PUBLICATIONS

Haartsen, et al., "Bluetooth—A New Low-Power Radio Interface Providing Short-Range Connectivity," Proceedings of the IEEE, vol. 88, No. 10, Oct. 2000, pp. 1651-1661.*

(Continued)

*Primary Examiner* — Minh D Dao
(74) *Attorney, Agent, or Firm* — Steve Wight; Brian Haslam; Micky Minhas

(57) ABSTRACT

The claimed subject matter provides for systems and/or methods for a dynamic range wireless access point to initiate deliberate and/or selective communications with one or more wireless devices over a short range radio path. One embodiment of an access point system comprises a processor that transfers one or more wireless devices to a long range radio path once a transition condition has been met. In another embodiment, an access point system may affect transactions between user/customer's smart devices and a commercial place of business where the access point system and the smart devices initiate communications when the smart devices are deliberately placed within the proximity of the access point antenna and/or the smart devices are brought within the vicinity of the access point antenna such as by passing through the entrance or exit to the place of business.

20 Claims, 9 Drawing Sheets

(56) References Cited

U.S. PATENT DOCUMENTS

| | | | | |
|---|---|---|---|---|
| 2007/0265001 | A1 | 11/2007 | Dias et al. | |
| 2008/0287062 | A1 | 11/2008 | Claus et al. | |
| 2009/0149157 | A9 | 6/2009 | Gallagher et al. | |
| 2009/0305742 | A1 | 12/2009 | Caballero et al. | |
| 2010/0105394 | A1* | 4/2010 | Cheng et al. | 455/440 |
| 2010/0107067 | A1 | 4/2010 | Vaisanen | |

OTHER PUBLICATIONS

"International Search Report", Mailed Date: Mar. 19, 2013, Application No. PCT/US2012/059627, Filed Date: Oct. 11, 2012, pp. 12.

Haartsen, et al., "Bluetooth—A New Low-Power Radio Interface Providing Short-Range Connectivity", Retrieved at http://www.ece.rochester.edu/courses/ECE237/readings/bluetooth.pdf>>, Proceedings of the IEEE, vol. 88, No. 10, Oct. 2000, pp. 1651-1661.

* cited by examiner

DYNAMIC RANGE WIRELESS COMMUNICATIONS ACCESS POINT

BACKGROUND

Near Field Communication ("NFC") is an emerging technology that enables transactions—e.g., Point Of Sale ("POS")—and communications between at least two NFC-enabled devices at very short ranges.

Touch-based gestures are possible with NFC-enabled devices in order to pair two such NFC-enabled devices. These close range-based gestures provide for selectivity between the devices to be paired, among many other devices that may be nearby. And that the devices must be physically brought together requires a deliberate action, removing the ambiguity that might be present with longer-range radio connections such as Bluetooth, WiFi, or 3G/4G cellular.

However, merchants who may be interested in the commercial possibility of utilizing NFC at the point of sale or point of service within their retail stores, may find that few customers have NFC-enabled phones that enable these types of transactions.

Heretofore, NFC-enabled devices are not as ubiquitous as other types of wireless communications—for example, Bluetooth-enabled and/or WiFi-enabled devices. In addition, given the established infrastructure for these other wireless standards, these other wireless standards have many desirable attributes but as previously embodied, lack the benefits of the selective and deliberate nature of NFC transactions.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Some embodiments of the present application provide for systems and/or methods for a dynamic range wireless access point to initiate deliberate and/or selective communications with one or more wireless devices over a short range radio path. One embodiment of an access point system comprises a processor that transfers the communication path of one or more wireless devices from the short range radio path to a long range radio path once a transition condition has been met. In another embodiment, an access point system may affect transactions between user/customer's smart devices and a commercial place of business where the access point system and the smart devices initiate communications within the entryway of the place of business.

Some embodiments of access point system comprise two antennas and two radio systems—one a short range radio and the other a long range radio. In other embodiments, an access point system may comprise a single antenna and radio system whereby the radio system may modulate its signal strength to affect both short and long range communications. Such modulation may be done in a time multiplexed manner.

In other embodiments, an access point system may employ a Bluetooth stack for initiating short range communications with smart devices and initiating communications with smart devices that make deliberate gestures to start communications.

In other embodiments, an access point system may handoff communications with wireless devices upon detection of a suitable transition condition. Such suitable transition condition may comprise an indication that a wireless device is going out of range, or to satisfy security policies for a given business or environment in which the access point system is implemented.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
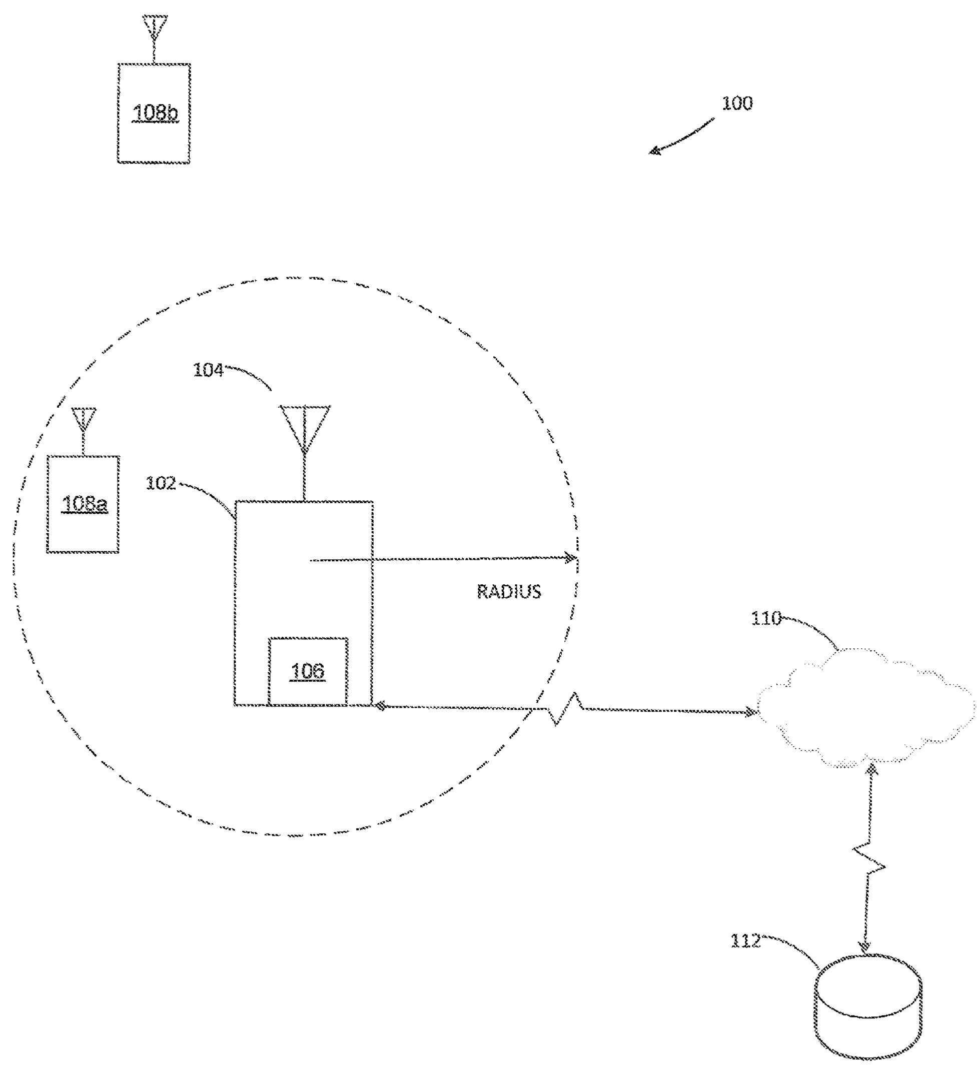
FIG. 1 shows a general environment of a Point of Sale (POS) transaction system.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

A wireless access point system will now be described that affects communication connections with smart devices that are within the operating volume of the wireless access point system. In some embodiments, such an access point system may affect a communications path between the smart devices and a business' transaction processing system. This access point system would, thereby, offer customers—who are entering into a place of business—to be connected to services in a number of embodiments. For example, in one such embodiment, connection to services might occur by a customer walking through the business' entrance with a wireless device wherein the entrance is within the operating volume of the wireless access point system. In another embodiment, the customer could deliberately place the smart device within the proximity (e.g. within a few centimeters) of the wireless access point system. Such a wireless access point system gives the business the flexibility to enable a wide array of options for customer connection to business services onsite, ranging from passive (e.g. walk through the vicinity of the access point system) or actively (e.g. deliberately placing their smart devices within the proximity of the access point system). Referring now to FIG. 1, a general system 100 of a POS transaction is shown. Transaction device 102 authenticates and communicates with trusted devices 108*a* and 108*b* within the effective radius of an antenna 104. Authentication, procedures for setting up secure communications and enabling transactions may be accomplished via processor 106 under suitable software control.

Devices 108*a* and 108*b* may be "smart devices"—i.e., devices that are typically portable and have sufficient computing and communications capability, such as smart phones, pad devices and the like. In the case of device 108*a*, device 108*a* is within the effective radius of antenna 104—and, thus, is capable of communicating with transaction device 102. However, device 102*b*, as shown, is outside the effective radius of antenna 104.

Transaction device 102 may, in addition, be in communication with other devices 112, either directly or possibly via the internet or cloud services 110. In this manner, transactions may be further processed and booked with many other typical back office functions, such as accounting, shipping, receiving, order processing and the like.

It will be appreciated that the scenario illustrated by FIG. 1 may be enabled by a number of wireless technologies and standards. One such wireless technology might be NFC—with a number of potentially desirable features and not so desirable features to consider.

NFC devices typically have antennas and effective ranges that operate in the range of approximately 10 cm or less. This limited range creates a communication system which has a natural selectivity and requires a deliberate gesture to activate but which supports spontaneous use and with a method of use that is obvious to end users.

However, as is shown in FIG. 1, the small effective range—while possibly an enhancement to secure communications—may be not so desirable in certain environments in which this infrastructure is intended to operate. For one example, a transaction system may be asked to function within a large shopping store (e.g., Costco®, Wal-Mart® or other such retailers), hospitals, theatres, or even within a home. Each of these environments—while sharing some traits as commercial places of businesses that affect transactions with users/customers—has unique challenges and features that may not be well served by NFC technology.

In the case of a large shopping store, the transaction devices and infrastructure may enable users/shoppers to shop and communicate with the store's back office functions on a basis more widely available than is offered by the effective 10 cm radius of an NFC-enable antenna. Shoppers may want instantaneous information on price, availability or other specifications of store items that the shopper may see while roaming through the stores. Additionally, shoppers may want to make purchases in real time.

To enable such functionality via NFC might entail a substantial investment. In the case of NFC-enabled devices, a NFC reader may cost on the order of five hundred US dollars ($500)—which is typically a cost borne by merchants. Thus, to have a NFC-enabled transaction environment, multiple NFC readers may have to be acquired and this may be a significant factor as to whether any given merchant adopts NFC-enabled transactions or not.

As a part of enhancing secure transactions via very short range communications, NFC tends to affect device pairing in a manner that is both deliberate and selective. NFC device pairing is "deliberate" in that a pairing gesture is often performed (i.e., touching two NFC-enabled devices) and "selective" (i.e., a NFC-enabled device is rarely connected to two devices while performing a single pairing gesture).

An Embodiment of a Dynamic Range Access Point System

In contrast to NFC's range limitations—as well as slow adoption amongst merchants and handset/smart phone manufacturers, other wireless communications standards and/or protocols exist that are now both widely adopted and inexpensively implemented. One such wireless infrastructure is Bluetooth.

As part of its specifications, Bluetooth affects multiple range RF communications. In fact, Bluetooth antennas may be referred to by "classes": Class 1 antennas have ranges up to approximately 100 meters, Class 2 up to approximately 10 meters and Class 3 up to approximately 5 meters. While 5 meters is a significantly more selective operating range than 100 meters, it may not be selective enough to distinguish one user's device from another nearby device in practical implementations.

Figure 2:
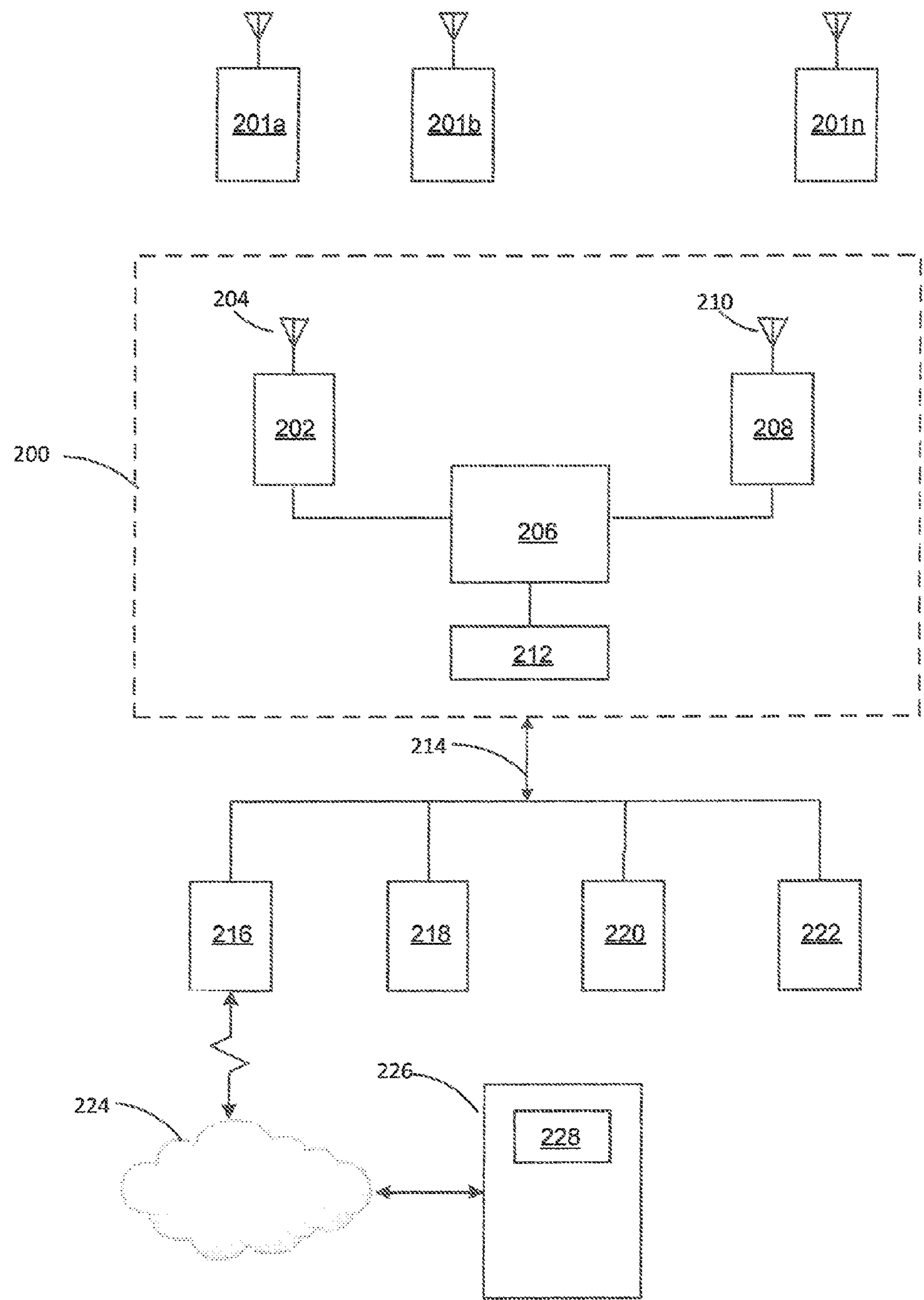
FIG. 2 shows one embodiment of a dynamic range wireless communications access point system is shown.

FIG. 2 depicts one embodiment of a dynamic range wireless communications access point system. In this embodiment, access point system 200 may comprise a low and/or variable power RF radio 202. Low and/or variable RF power signal may be sent to a suitable antenna 204 that may be directional to reduce the possibility of eavesdropping attacks—or to an antenna 204 that may be omni-directional, but emitting low and/or variable RF radio signals. RF radio 202 is connected to processor 206 which may affect a Bluetooth stack and other processing, as described further herein. Processor 206 may comprises both computing and computer readable storage elements for access point system to implement a wireless standard, e.g., Bluetooth, Wifi or the like.

As part of this embodiment, processor 206 may be connected to, and send suitable control and data signals to, a second, longer range RF radio 208 and RF antenna 210 which may be omni-directional or directional depending on the characteristics of the environment in which access point system 200 is running.

Processor 206 may interface and connect with other, optional, communication and/or computational devices via interface 212. Interface 212 makes a connection 214 that may be wired (e.g., USB, serial, parallel or the like) or it may be any suitable wireless interface. Such optional communication and/or computational devices with which interface 212 may connect comprise: computer 216, POS device 218, smart phone 220 or a connection 222 where connection may be provided to a broadband modem, WiFi system, ultra-wideband RF system, or cellular radio system.

For merely one example, computer 216 may further connect with internet and/or cloud-based systems or services 224—which may, in turn, connect with other devices 226 that run a host of applications 228—e.g., back office applications for sales, accounting, distribution, ordering or the like. Similarly, POS devices, such as device 218, may be distributed throughout the exemplary shopping store, to affect sales and ordering of goods and/or services. Smart phones 220, typically comprising computing modules, may perform similar functions as computer 216 and/or POS device 218. Lastly, connection 222 may place access point system 200 in connection with still other computing, communicating and/or smart devices, available through the internet and/or cloud-based systems or services.

Figure 3A:
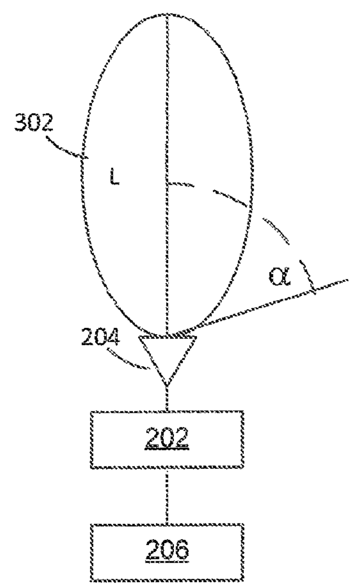
FIG. 3A shows one embodiment of a directional RF beam.

In addition to a low powered mode, antenna 204 may be configured to emit a directional and/or shaped RF beam. FIG. 3A shows one possible embodiment of such a directional RF beam 302 as emitted by antenna 204 wherein antenna 204 is powered by RF radio 202 under control of processor 206. Such directional antennas are known in the art and the use of such directional RF beam may further enhance selectivity by deliberate placement of the RF antenna 204. Beam 302 may be specified by length L and spread angle, α. Such a beam may be placed as desired to cover the small amount of space of an entrance or exit, thus enabling communications with customers only as they enter or leave the store.

Figure 3B:
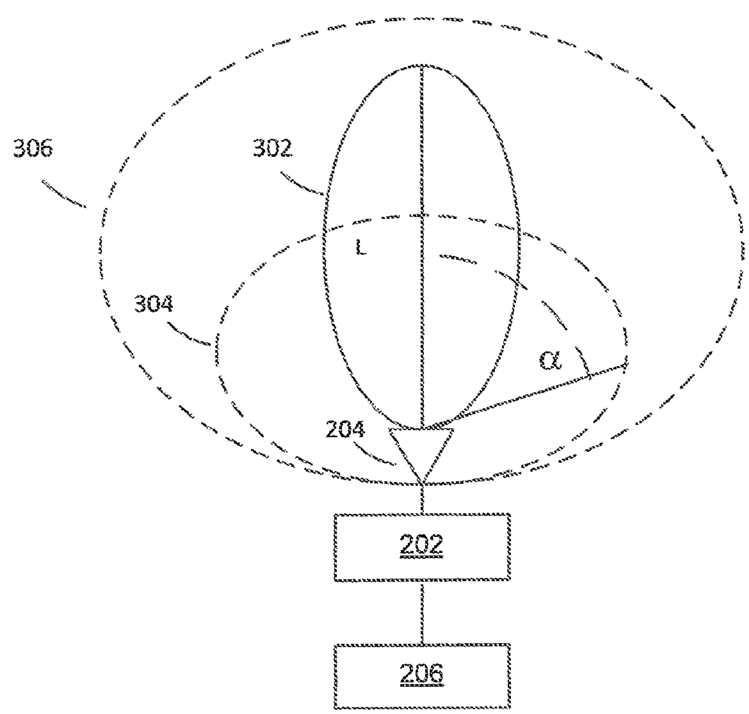
FIG. 3B shows a comparison of a directional RF beam with a variable powered RF beam.

By comparison, FIG. 3B shows beam shape 302 that may be produced by a directional antenna—versus beam shape 304 that may be produced by a low and/or variable power, omni-directional antenna. If the power of the RF signal is modulated, then beams 304 to 306 may represent the variable effective radius of such an omni-directional antenna. As mentioned, depending on the level of selectivity desired and the dimension of the entrance (or area for pairing with customer's smart devices), the beam shape and strength may be selected as desired.

Proximity and Vicinity

For purposes of this application, the notion of proximity refers to a small enough operating volume in which the user must deliberately take the action of placing their device within the operating volume of the wireless access point system to affect communications. In this embodiment, the access point system comprises a first short range antenna that has a first effective communication range—i.e., a "proximity"—in which the access point system may initiate communications with one or more devices.

In contrast to the notion of proximity, the notion of vicinity refers to an operating volume large enough such that communications between the wireless access point system and devices occur without deliberate actions (such as, touching a device to the access point); but small enough, and selective enough, to enable communications between users and the access point only within a defined (and deliberately shaped) operating volume—such as walking through an entryway or other meaningful physical space that a person would walk through or be around.

In contrast to "proximity", users should experience being in communication with the environment (e.g., store, hospital, theater, home) when in the "vicinity" of the access point system and/or its environment. As the users move in space and time in the environment, it may be the case that certain users have moved beyond the vicinity of the access point system. The access point system itself may be comprised of multiple operating volumes, as may be designed advantageously for the environment. Over this space and time, certain users may move into and out of the vicinity of the these operating volumes, depending on their movements. Communications occur only when their movements bring them within the vicinity of at least one of these operating volumes.

Figure 4:
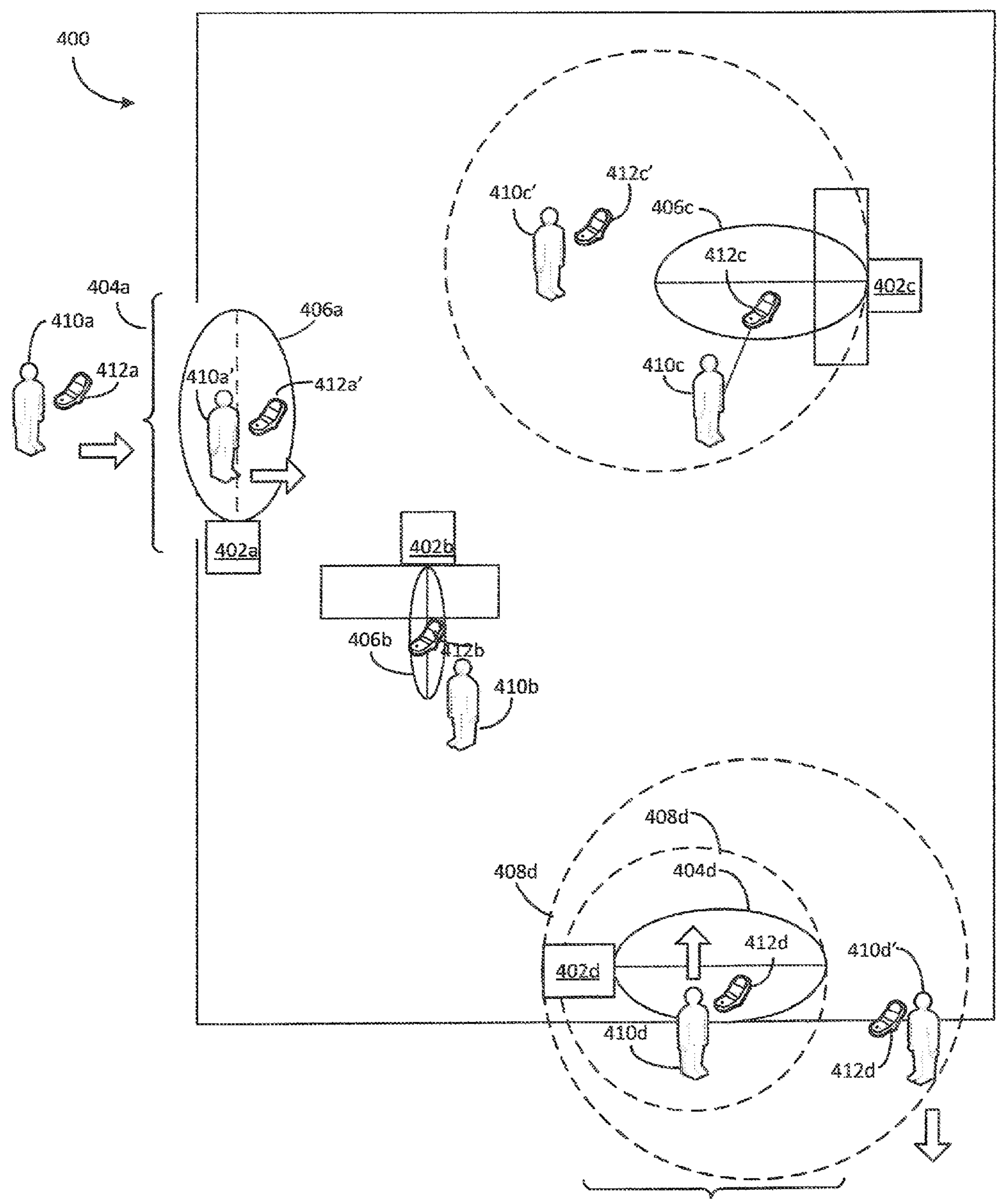
FIG. 4 is a top view of one possible environment comprising a number of access points that may connect with users and their devices within one or more operating volumes of each access point.

FIG. 4 depicts one possible environment 400, e.g. a large store, as seen in top view. Environment 400 may comprise a number of access point systems (e.g. 402*a* through 402*d*), deliberately placed within environment 400. Each access point may itself comprise one or more unique operating volumes which each such operating volume matched deliberately for a particular purpose. For example, some access points may be placed near one or more entryways (e.g. 404*a* and 404*d*) and their respective operating volumes, 406*a* and 406*d*, may be shaped such that the operating volume covers the volume of the entryways 404*a* and 404*d*. In addition, access point 402*d* may further comprise a second operating volume 408*d*—which may be a static operating volume (as noted by a first dashed line) or dynamic (which may expand its operating volume out to a second dotted line). This second operating volume may be affected by a second long range antenna—which, if such second long range antenna is of variable power may produce operating volumes out to the second dotted line.

As may be seen at entryways 404*a* and 404*d*, users 410*a*, 410*a*', 410*d* and 410*d*' may be either entering or leaving the stores, as shown according to their arrows. User 410*a* has smart device 412*a* and will be entering the store; but is outside the operating volume (406*a*) of access point 402*a*. User 410*a*', however, is currently traversing the entryway and smart device 412*a*' is within operating volume 406*a*. Likewise, user 410*d* is entering the store and is within first operating volume 406*d* of access point 402*d*. User 410*d*' is leaving the store and is outside first operating volume 406*d*; but within second operating volume 408*d*.

Other access points with environment 400 may be strategically and/or deliberately placed to affect different business transactions. For example, access point 402*b* may be placed close to a particular product or display to affect a Point of Sale access point. In such a case, operating volume 406*b* may be within a few centimeters of the POS, so that user 410*b* must deliberately place device 412*b* within the small operating volume (406*b*) in order to achieve a particular goal or task, e.g., purchase a particular item.

Another access point 402*c* is depicted having a first operating volume 406*c* which is larger than a few centimeters and may be used to affect a different goal or task for user 410*c* having device 412*c*, e.g., getting pricing information or other product information about a good and/or service displayed near access point 402*c*. In addition, access point 402*c* may have a second operating volume 408*c* that may be used to perform same or different goals or tasks as first operating volume 406*c*. Second operating volume 408*c* allows user 410*c*' to move in space and time and continue to be connected via device 412*c*'.

It will be appreciated that the embodiment of FIG. 4 is used merely for description and that a variety of environments having multiple access points with multiple operating volumes may be strategically placed in another environment to give meaning and functionality to the environment and to its users.

Deliberate and Selective Communications

It may be desirable that the initial communications between the access point system and one or more wireless devices affect the same sense of deliberateness and selectivity that is found in NFC-enabled communications. In this case, the initial communications may be based upon a deliberate gesture of a user/customer—e.g., placing the smart device next to a kiosk (i.e. within its proximity). Other deliberate gestures of a user/customer are possible for purposes of the present innovation. For example, a customer who has his/her smart device turned on in the proximity of an access point system is one example of a deliberate gesture.

Figure 5:
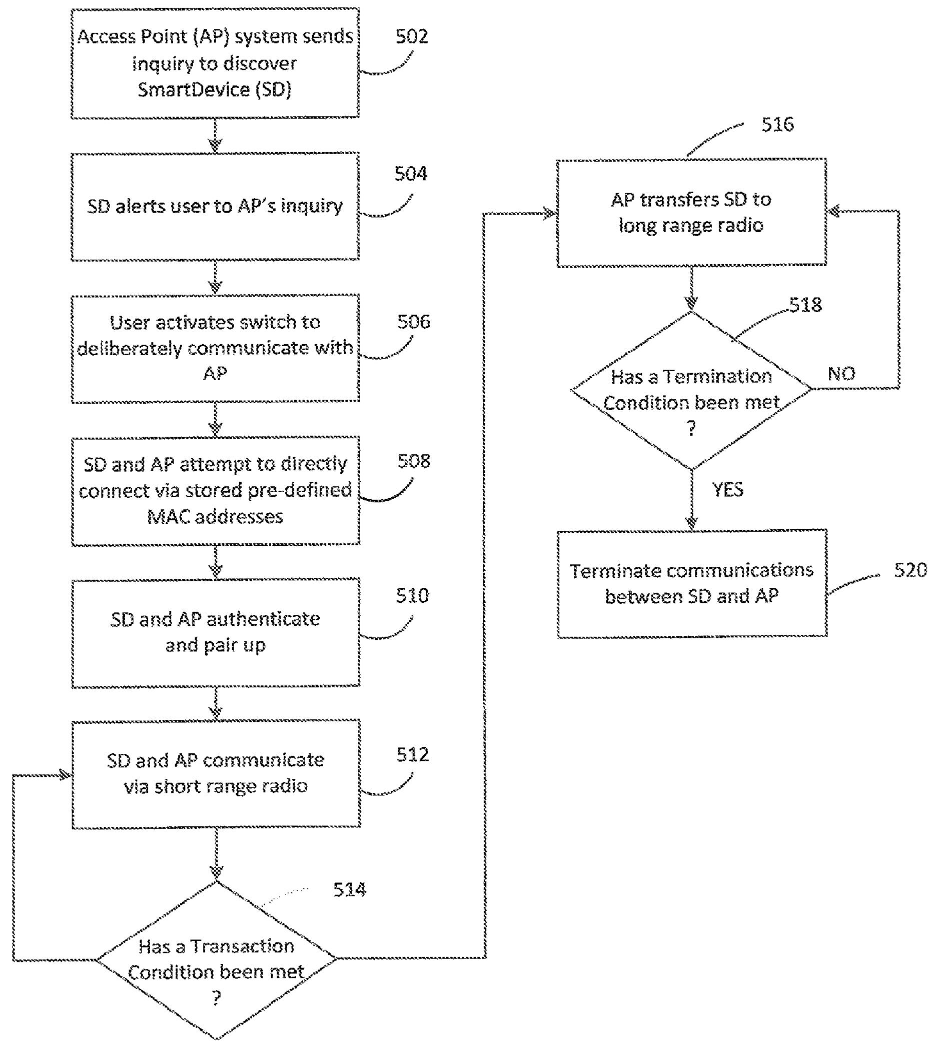
FIG. 5 shows one embodiment of a flow chart depicting the processing of communications between an access point system and a smart device.

In one embodiment, once the user/customer's smart device is in proximity or vicinity of an access point wireless system, the smart phone may detect signals from such access point system and alert the user/customer to this fact—and the user/customer may activate a physical or soft switch (such as shown in FIG. 5) to effect deliberate wireless communications with this access point system, now known to the user/customer.

Selectivity (i.e., reducing the possibility that one wireless device does not inadvertently attempt to connect to two different access points) may be enhanced by precisely defining the operating volume of the wireless access point. That is to say, if the operating volume of each access point is well defined and constrained so as not to overlap the operating volumes of other access points, it is not likely that a user/customer's smart device will attempt to connect with more than one access point system at a time in the same environment. This is in contrast to the design goals for Bluetooth in general, regardless of the antenna class used.

As with the design of the short range radio and antenna above, the design of the long range antenna should take into consideration the environment in which is meant to operate. For example, if the access point system is to enable wireless communications with customers in a large store, then the second long range radio may be desired to cover communications within the store and perhaps beyond its physical boundaries (e.g., into the parking lot).

In yet another environment, such as hospital, the operating volume for the long range radio may be greatly reduced from the store example; but may be larger than the proximity and vicinity of the first short range radio and/or antenna. In the case of a hospital with many beds in many rooms, there may be a greater need for selectivity in communication to ensure the proper communication end points are established. Tight constraints on "proximity" of the first short range radio and/or antenna ensure this; but, once selective communication has been established, communications may continue in a larger operating area—e.g., a hospital ward or the like.

As will be discussed below, in some embodiments described herein, it may be desired to have the first short range radio and/or antenna to be one and the same with the second long range radio and/or antenna. This may be accomplished by varying the power to the combined first and second radio/antenna system. The desirability of using one antenna to affect both short and long range communications may depend upon the security and ease of use needs of the given environment.

One Environment Embodiment

As discussed above in connection to FIG. 4, such a access point system may be implemented in a number of different environments and configured as desired to work suitably with a given environment. A first embodiment may be a large shopping store. Such an access point system might be implemented as a transaction device for such a large shopping store.

Although there are many different types of stores and different ways in which such stores function and service their customers, there may be some features which are common to such stores. For example, it may be fairly assumed that customers enter the store through either one or a small discrete number of entrances.

Through these entrances, shoppers enter the store, their numbers possibly varying over time, depending on what goods and/or services are available and what time of day it is. For example, a large "big box" store may have a spike in customer traffic after working hours—when people leave work and begin to shop.

As customers enter the store, it may be the case that such customers may have their smart phones or other such smart devices actuated in an "ON" condition—thus these devices are receptive to communicating with access point system. In fact, if it is known to these customers that such an access point system is implemented in this particular store, they may desire to have their smart phones switched ON and actuated for communications with the access point system, in order to take advantage of the ease of shopping afforded by the access point system.

In one embodiment, these access point systems may be Bluetooth enabled and authenticate and pair up with other Bluetooth enabled devices. To detect shoppers as they pass through a given physical location (e.g., the entrance), low and/or variable RF powered radio send out signals to devices to communicate with access point system in a constrained effective radius that covers a desired distance—e.g., the dimension of the entrance.

Returning to the large shopping store example—i.e., a "big box" store, low and/or variable powered RF radio may be dedicated to the task of authenticating and pairing customer's smart devices with the access point system. Once customers have made it through the entrance of the store and begin to roam, customers may desire to interact with access point system for such services as: price check, product availability check, order and/or purchase goods and/or other services offered by the store.

To facilitate such interactions, in one embodiment, access point system may maintain a communication session with customers using a longer range radio and antenna, for example, 208 and 210 of FIG. 2, respectively. Access point system may use any such radio specification known and/or available—including: Bluetooth (e.g., perhaps via Class 2 or 3 RF radio), WiFi communications or any other suitable wireless communications. As consumer smart devices have evolved and continue to evolve, it is likely that such smart devices may allow wireless communications via multiple standards. Thus, it may be possible to hand-off communications that started on the access point systems short range Bluetooth wireless communications to a longer range wireless communications system as desired. Such hand-off may be implemented in a substantially seamless and transparent manner to the customer.

By allowing a short range authentication and pairing on a selective and operating volume-limited wireless subsystem, and then automatic handing-off to another longer range wireless subsystem, the access point system provides for natural and easy connection to a conventional wireless systems without relying on customer equipment that has been enabled for NFC radio communications—existing Bluetooth customer equipment can be used.

Initial Communications and Transfer/Hand-Off

As mentioned, one of the first tasks for the access point system is to initiate communications with one or more user's smart devices. As is well known, NFC pairing is relatively quick—e.g., on the order of 100-500 ms, using touch-based gestures, wherein two NFC-enabled devices are brought within approximately 10 cm or less of distance of each other. As discussed above, however, access point system may use a different first wireless subsystem—e.g., Bluetooth or WiFi—that are not so limited in range as NFC.

In the case of Bluetooth radio communications, it is well known that Bluetooth takes a longer time on average for two Bluetooth enabled devices to: (1) discover each other and then (2) pair up and become ready for application communication. In a typical case of two devices that, theretofore, were not aware of each other, the discovery and pairing time in Bluetooth may be on the order of 10 seconds. In the case of the shopping store, such a delay may not be desired. In fact, the designer of an access point system for a store may desire that secure communications be initiated on the order of the time it takes a user to cross the threshold entrance of the store—e.g., one or a few seconds, or less.

One reason for the delay of up to 10 seconds for Bluetooth is that both devices discover each other by knowing the other's Media Access Control (MAC) address. In the Bluetooth environment, communications proceed under a frequency hopping scheme—which adds to the delay of initially discovering each other's MAC address.

To speed up the pairing process in Bluetooth, one embodiment for the access point system of the subject innovation would be for the manufacturer of the access point system to receive a block of pre-assigned MAC addresses. These pre-assigned MAC addresses may be stored in storage (e.g., RAM, ROM or the like) into both computer readable storage of processor of the access point system and into user's smart devices. Having a cache of pre-assigned MAC addresses to search, user's smart device would first attempt to initiate communications using this block of MAC addresses—thus, reducing the amount of time used for the access point system and the user's smart device to discover each other. Thus, in one embodiment, the access point may—upon receiving a pairing request from one of a plurality of devices with diverse MAC addresses (where these diverse MAC addresses are not known in advance to the access point), and where the access point MAC address is one of a plurality of MAC addresses known in advance to the device initiating the pairing request—reply to a pairing request to accept the request and establish communications. Once these two devices have discovered each other, authentication and pairing may then proceed in the normal course under the Bluetooth specification. In one embodiment, by speeding up the time to complete the pairing process, the time to pair a customer's smart device with the access point system would be on the order of time it take the customer to walk through the entrance which is in the vicinity of the access point system. For the customer, pairing his/her smart device with the access point system would seem seamless and automatic.

FIG. 5 shows one possible embodiment of a flow chart depicting the processing of communications between an access point system of the present innovation and a smart device. At 502, access point system, once installed and activated in a given environment, could send out inquiry signals to discover any smart devices that may be entering its proximity and/or vicinity. If a user/customer, with a properly configured and activated smart device, is passing through the vicinity of an access point system or presents their properly configured and activated smart device within the proximity of an access point system the smart device may begin communicating with the access point system at 504.

Figure 6:
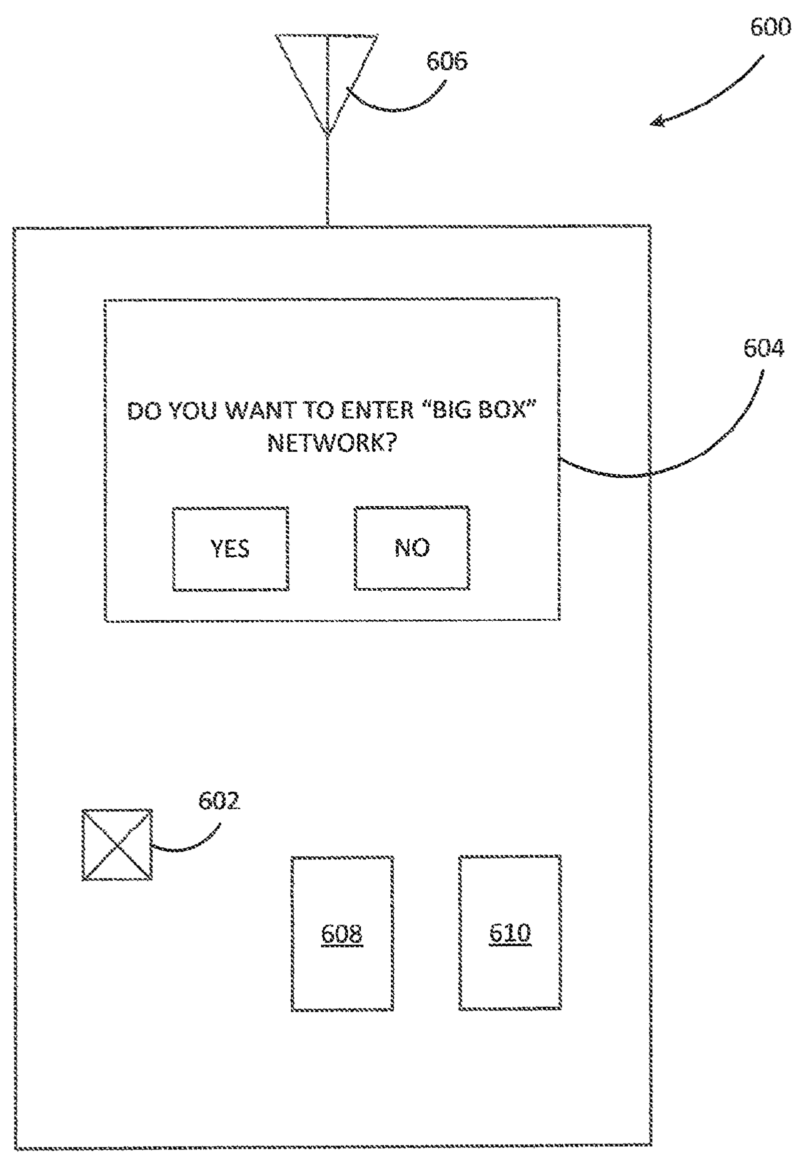
FIG. 6 shows one embodiment of a smart device that might work with a dynamic range wireless access point system.

At step 506, user may be presented with a possible option of performing a form of deliberate gesture to affect further communications and connection to services provided by the access point. One such deliberate gesture would be for the user to "touch" the access point with the device. In another case, the user/customer might activate a switch (either physical switch on the smart device or a soft switch on an application running on the smart device) at 506. FIG. 6 depicts such alternative embodiment of a smart device 600 that may give notice to the user that it has detected a signal through its wireless antenna 606 that it is entering into an operating volume of an access point system and the user may depress a physical button and/or switch 602 on the smart device—or, alternatively, by depressing a soft switch on a touch screen 604. In another embodiment, the switches or UI features of the device may be affected as entering a PIN code to confirm deliberated action or a confirmation dialog to confirm a passive vicinity action.

It will be appreciated, however, steps 504 and 506 may be optional—as selective communications between the access point and the device may be performed transparently to the user or otherwise passively accomplished. The access point system and the smart device could discover each other, authenticate and pair up, as a transparent process to the user. Thus, the present innovation may support either such deliberate action (e.g., touching or activating a switch or the like) or passive actions (e.g., the access point system is tuned to detect only devices that pass within a suitably defined vicinity without further deliberate action).

Once the access point system and smart device discover each other, the access point system and the smart device could attempt to directly connect with each other by trying the set of pre-defined MAC addresses stored in both the access point system and the smart device at step 508. This could speed up the process of initiating communications as discussed above. For example, as shown in FIG. 6, smart device may comprise processor 608 and storage 610, in which a set of pre-assigned MAC addresses have been stored for the purpose of speeding up initial communications.

It will be appreciated that this step could be optional as well. Alternatively, the access point system and the smart device could authenticate and pair up in the usual manner—e.g., according to the Bluetooth standard. At step 510, the access point system and the smart device authenticate and pair up. At 512, the access point system and the smart device start to communicate via the short range radio system.

This short range communication may continue until a transition condition has been met at 514. It should be appreciated that the transition condition should be considered flexible and subject to the design of any given access point system and the environment it is intended to operate. For example, one suitable transition condition could be that the short range radio is detecting a weakening or weakened signal from the smart device—indicating that the smart device is going out of range of the short range radio (i.e., a "device-out-of-range" condition). This transition condition may be very suitable for a store environment—where a number of users might connect and communicate with the short range radio on the order of the entrance to the store and taper off quickly thereafter.

Many possible different embodiments are possible to create hybrid access point configurations. For example, one configuration might employ proximity (e.g. a device within the operating volume of the short-range access point) to gain access to a restricted space or service. Once access has been granted and communications within the space or service are commenced, access and/or communication may continue to be monitored and authorized as long as the device is within the vicinity of the access point. Such access and/or communications may be terminated when the device moves outside of the vicinity (e.g. operating volume of the access point). Such a hybrid case might allow for the use of the access point system to monitor and/or supervise the physicality of the device while simultaneously relying on other conventional long-range communications for service delivery (e.g. 3G/4G, WiFi, etc.).

The transition condition could be a rule that all smart devices are transitioned to long range radio communications as soon as communications have been established with the access point system (i.e., a "communications-initiation" condition). Another such transition condition could be the "time-out" condition—e.g., a handoff occurs after a certain amount of time has transpired. Of course, many other transition conditions can be devised according to the design of the access point system and its operating environment.

If a transition condition has been met, then the access point system could transfer smart device communications to long range radio at step 516. This long range communications may continue over time—for example, as long as the smart device is within the vicinity of the access point system, its operating environment or over any other desired time or space characteristics. In one embodiment, communications with the access point system may ultimately be transferred to tunneled communications channel.

If a termination condition has been met at 518, then communications between the access point system and the smart device may be terminated at 520. As with the transition condition, the termination condition may be flexible according to the design of the access point system. For example, one termination condition could be that the smart device is becoming out of range of the long range radio and so communications are terminated. In another embodiment, communications with the smart device may be transferred to another route of communications, such as to a commercial wireless carrier and no longer through the access point system.

Additional Access Point Embodiments

Figure 7:
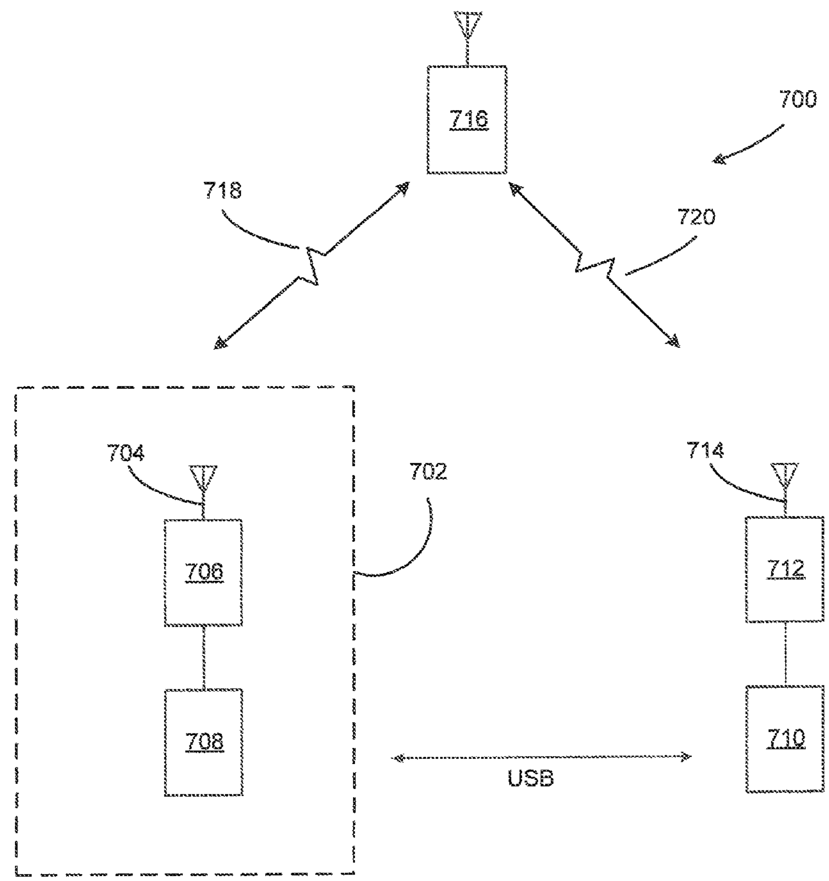
FIG. 7 through FIG. 9 show alternative embodiments of a dynamic range wireless access point system.

FIG. 7 shows another embodiment of a dynamic range wireless access point system and its environment 700. In this particular embodiment, there is a single-antenna subsystem 702 which further comprises short range antenna 704, short range radio and stack 706, USB controller 708. In one embodiment, radio and stack 706 is a Bluetooth stack or any other suitable communications standard.

Radio and stack 706 interfaces through USB controller 708, which connects to a host PC 710. Host PC 710 comprises sufficient processing and storage to implement communications between smart device 716 and the access point system as described herein. Host PC is further connected to long range radio 712 which, in turn, is connected to long range antenna 714.

In this embodiment of FIG. 7, the single antenna subsystem in the access point device may handle the deliberate and selective gestures (in wireless communications path 718) between the access point antenna and smart device 716. An application on the smart device may attempt to pair with a known access point MAC address (as discussed above) and, upon entering the pairing radius, may initiate a data exchange with host PC 710 via a USB connection 708. From here, host PC 710 may dynamically increase the access point range in order to prolong the data exchange with the cell phone. It may also exchange the proper keys to enable the cell phone to easily and seamlessly connect with another local Bluetooth or WiFi network.

In a single-antenna embodiment, it may also be possible to time multiplex between a long range and a short range (and/or directional) access point functionality by modulating the power going into the antenna 704 to dynamically change the range. In this case, long range antenna 714 and long range radio and stack 712 may be optional.

Figure 8:
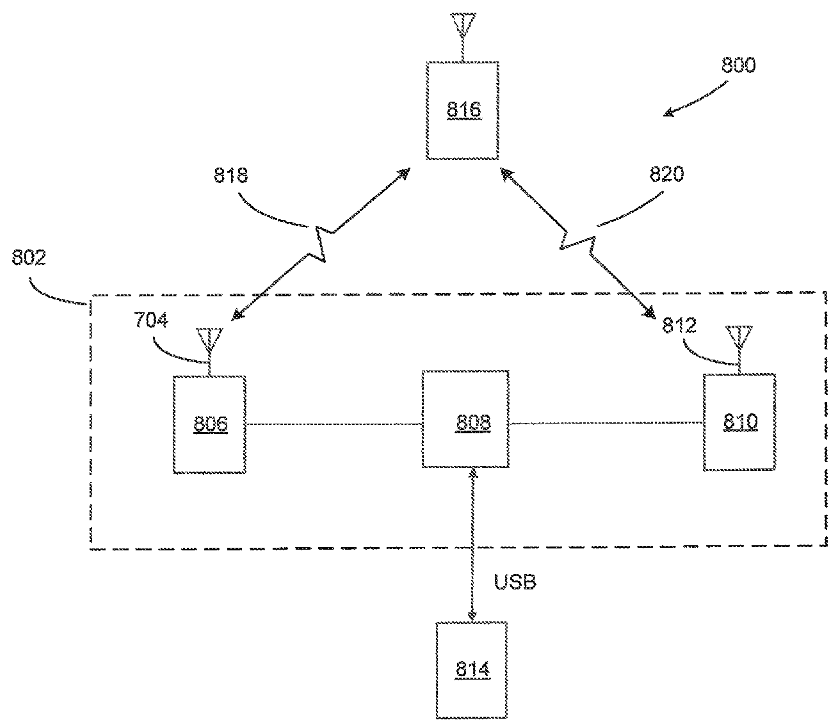

FIG. 8 shows yet another embodiment of a dynamic range wireless access point system and its environment 800. In this embodiment, there is a two-antenna subsystem 802 comprising short range antenna 804, short range radio and stack 806, processor 808, long range radio and stack 810 and long range antenna 812. Two-antenna subsystem 802 may communicate with host PC 814 via a USB connection. Smart devices 816 might communicate with two-antenna subsystem 802 along short range communications path 818 and long range communications path 820, as discussed above.

In one possible embodiment of this two-antenna solution, short range radio and stack 804 and 806 comprises a Bluetooth module which may be connected to an application running on smart device 816 upon entering the pairing range. This time however, the short range access point antenna may not need to be modulated to a larger radius (as in the single antenna embodiment) since a higher bandwidth wireless system may be also incorporated into the access point system. This may allow the host PC to communicate securely to the smart device 816 over a larger radius without need of external infrastructure. Processor 808 may manage the flow of data to the appropriate interfaces to the access point Bluetooth module, the high bandwidth and long range wireless connection, and the USB connection to the local PC.

Figure 9:
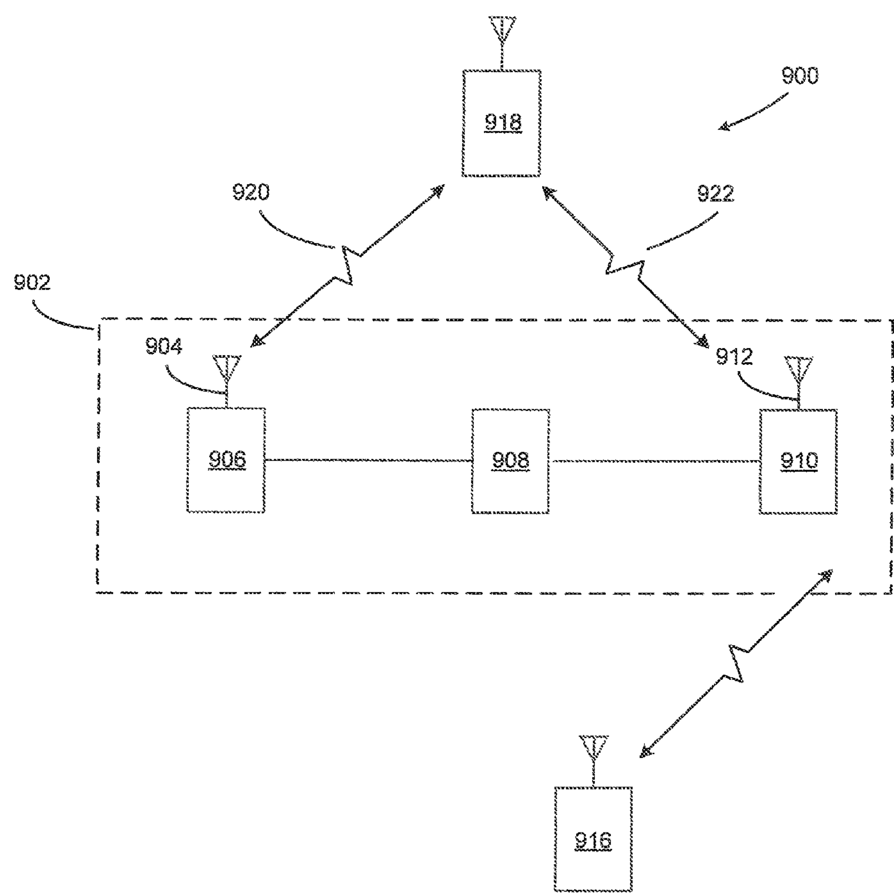

FIG. 9 shows yet another embodiment of a dynamic range wireless access point system and its environment 900. In this embodiment, there is a two-antenna subsystem 902 comprising short range antenna 904, short range radio and stack 906, processor 908, long range radio and stack 910 and long range antenna 912. Two-antenna subsystem 902 may communicate with host PC 816 via a long range wireless communication path 914. Smart devices 918 might communicate with two-antenna subsystem 902 along the short range communications path 920 and long range communications path 922, as discussed above.

In this embodiment of a remote access point system, the host PC may be anywhere within range of the long range wireless connection of the access point, which will increase the convenience of placing access points in places that may prohibit having a local laptop or PC. This may be desired for any situation where there may be a physical distance between the access point and the host PC. This, in turn, may give added flexibility to the designers and installers of access point systems.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms “includes,” and “including” and variants thereof are used in either the detailed description or the claims, these terms are intended to be inclusive in a manner similar to the term “comprising.”

The invention claimed is:

1. A wireless access point system, said wireless access point system deployed within a place of business capable of connecting and communicating with one or more wireless devices of customers for enabling point-of-sale transactions with said customers, said access point system comprising:

a first short range radio, said first short range radio having a first effective communication range, said first effective communication range comprising a first operating volume;

a second long range radio, said second long range radio having a second effective communication range greater than said first effective communication range;

a processor, said processor sending data and control signals to said first short range radio and to said second long range radio and further receiving data signals from said first short range radio and said second long range radio;

wherein said wireless access point system being capable of initiating selective and deliberate communications by alerting at least one wireless device of a customer and receiving a signal from said at least one wireless device, said signal representing a deliberate gesture from a customer to effect communications with said wireless access point system to engage in point-of-sale transactions via said first short range radio when said at least one wireless device is within the first operating volume of said first short range radio;

and wherein further said wireless access point system being capable of transferring communications with said at least one wireless device to said second long range radio when said processor detects a transition condition.

2. The access point system of claim 1 wherein said first operating volume comprises a proximity wherein initial communications between said one or more wireless devices and said first short range antenna are effected by said deliberate gesture by said customer, said deliberate gesture being one of a group, said group comprising: activating a physical switch on the customer’s wireless device and activating a soft switch on the customer’s wireless device.

3. The access point system of claim 2 wherein said first operating volume of said first effective communication range comprises the dimensions of an entrance to an environment through which users of said one or more wireless devices pass.

4. The access point system of claim 1 further comprising:

a first short range antenna, said first short range antenna connected to said first short range radio; and said first short range antenna further comprises a directional antenna.

5. The access point system of claim 1 wherein said transition condition comprising one of a group, said group comprising: a device-out-of-range condition, a communications-initiation condition and a time-out condition.

6. The access point system of claim 1 wherein said first short range radio comprises a Bluetooth enabled radio.

7. The access point system of claim 6 further comprising:

computer readable storage, said computer readable storage connected to said processor; and said computer readable storage stores a set of pre-defined MAC addresses, said set of pre-defined MAC addresses dedicated to said access point system.

8. The access point system of claim 1 wherein access point system further comprises an interface, said interface connected to said processor and further sending and receiving control and data signals from outside said access point system.

9. The access point system of claim 8 wherein said data and control signals are sent and received by one of a group, said group comprising: a computer, POS devices, smart phones, local area network, broadband modem, WiFi system, ultra-wideband RF system and cellular radio system.

10. The access point system of claim 8 wherein said access point system is implemented in a store and said data and control signals are sent and received from said store’s back office system.

11. A method for enabling communications for point-of-sale transactions within a place of business between one or more customer wireless devices and a access point system deployed within said place of business, said access point system comprising a first short range radio, said first short range radio having an effective communication range comprising a first operating volume, a second long range radio having an effective communication range comprising a second operating volume, a processor connected to both said first short range radio and said second long range radio; the steps of said methods comprising:

discovering one or more wireless devices within said first operating volume of said first short range radio;

alerting at least one wireless device of a customer as to the existence of said access point system to conduct point-of-sale transactions within said place of business;

receiving a signal from said at least one wireless device, said signal representing a deliberate gesture by a customer to effect communications with said access point system to engage in point-of-sale transactions within said place of business;

pairing said one or more wireless devices to said access point system; and upon satisfying a transition condition, transferring one or more wireless devices to said second long range radio within said second operating volume of said second long range radio.

12. The method of claim 11 wherein said method further comprises the step:

communicating with one or more wireless devices while said one or more wireless devices is within said second operating volume of said second long range radio.

13. The method of claim 12 wherein said second operating volume of said second long range radio comprises a space occupied by users of said one or more wireless devices.

14. The method of claim 11 wherein said step of discovering said one or more wireless devices within said first operating volume of said first short range radio further comprises the step:

receiving signals from one of said one or more wireless devices indicating that a user of one of said one or more wireless devices has activated a switch to deliberately engage in point-of-sale transactions with said access point system, said switch comprising one of a group, said group comprising: actuating a physical switch and actuating a soft switch on said one or more wireless devices.

15. The method of claim 11 wherein said step of discovering said one or more wireless devices within said first operating volume of said first short range radio further comprises the step:

upon receiving a pairing request from one of a plurality of devices with diverse MAC addresses, wherein said MAC addresses are not known in advance to the access point, and wherein the access point MAC address is one of a plurality of MAC addresses known in advance to the device initiating the pairing request, replying to said pairing request to accept the request and establish communications.

16. The method of claim 11 wherein said transition condition comprises one of a group, said group comprising: a device-out-of-range condition, a communications-initiation condition and a time-out condition.

17. The method of claim 11 wherein said transition condition comprises a transition policy set in accordance with environment in which said access point system is implemented.

18. The method of claim 11 wherein said first operating volume of said first short range radio comprises the entrance of a space through which users of said one or more wireless devices pass.

19. An access point system for enabling transactions between one or more wireless devices and a commercial place of business, said access point system comprising:

a radio subsystem, said radio subsystem capable of effecting short range wireless communication and long range wireless communications, said short range wireless communications defining a first operating volume, said first operating volume further comprising an entrance to said commercial place of business;

a processor connected to said radio subsystem and capable of sending data and control signals to said radio subsystem and receiving data and control signals from said radio subsystem;

an interface, said interface connected to said processor capable of transmitting transaction data and commands between said commercial place of business and said one or more wireless devices;

wherein said access point system being capable of initiating deliberate and selective communications by alerting at least one wireless device of a customer and receiving a signal from said at least one wireless device, said signal representing a deliberate gesture from a customer to effect communications with said wireless access point system to engage in point-of-sale transactions via said short range wireless communications; and further wherein further said wireless access point system being capable of transferring communications with said one or more wireless devices to said second long range radio when said processor detects a transition condition.

20. The access point system of claim 19 wherein said radio subsystem is one of a group, said group comprising: (1) a first short range radio and a second long range radio and (2) a single radio, said single radio capable of modulating its power to effect said short range wireless communication and said long range wireless communications.

* * * * *